3,061,570
PREPARATION OF CRYSTALLINE POLYSTYRENE SOLUTIONS
Roland J. Kern, Miamisburg, and Allen S. Kenyon, Dayton, Ohio, assignors to Monsanto Chemical Company, St. Louis, Mo., a corporation of Delaware
No Drawing. Filed Jan. 15, 1957, Ser. No. 634,161
7 Claims. (Cl. 260—30.4)

This invention relates to polystyrene, and more particularly to that type of polystyrene known as "crystalline polystyrene." More specifically, the invention relates to methods for making solutions of crystalline polystyrene.

The ability of certain kinds of polystyrene to crystallize has been attributed to a sterospecific configuration of asymmetric carbon atoms in the polystyrene chain. (See G. Natta, Journal of Polymer Science, 16, 143–154 (1955).) The appropriate sterospecificity is apparently obtained only with particular polymerization techniques and/or with the use of specific types of polymerization catalysts. Examples of such polymerization processes are described by Williams et al., Journal of the American Chemical Society, 78, 1260 (1956) (including the Morton reference cited as footnote (3) in the Williams et al. article), and in the copending application Serial No. 498,254, filed March 31, 1955, by one of the inventors of the present invention.

Crystalline polystyrene has several unique advantages over conventional amorphous polystyrene, particular advantages being greater tensile strength (especially in oriented films and fibers) and much higher heat distortion temperature. Up until the present time, extensive evaluation and commercial development of crystalline polystyrene has been considerably hampered by the fact that it is substantially insoluble in all known solvents, thus making it very difficult to measure molecular weights, spin fibers, cast films, etc.

We have now found a special process whereby crystalline polystyrene can be dissolved in any solvent which will dissolve conventional amorphous (as distinguished from crystalline) polystyrene. This process involves heating the crystalline polystyrene and the solvent together at a temperature above about 160° C., and preferably above about 170° C., under a total pressure at least as great as the vapor pressure of the solvent at the temperature of dissolution. Once dissolved, the crystalline polystyrene solution can be cooled to room temperature without precipitation of the polymer—even though the polymer would not have dissolved in the solvent at room temperature. Solutions containing as much as 10 or 20 percent by weight of crystalline polystyrene can be readily prepared by the foregoing method and are useful for solution spinning of fibers, casting of films, etc.

The terminology "a solvent which will dissolve conventional amorphous polystyrene" as used herein is intended to refer to solvents which are miscible with conventional amorphous polystyrene at around room temperature—i.e., about 25° C. or 30° C. Preferred solvents are those boiling below about 160° C., since these solvents are relatively more volatile and consequently easier to remove by evaporation after the polymer has been processed. However, it is not necessary to remove the solvent by evaporation, since this generally can be done as well, and often better, by precipitation methods. A convenient precipitation technique is that of adding a precipitating agent—e.g., a liquid which is miscible with the polystyrene solvent but which is not itself a solvent for polystyrene (either crystalline polystyrene or conventional amorphous polystyrene). Water is a particularly desirable precipitating agent, especialliy for use in solution spinning techniques. Consequently, a preferred embodiment of the present invention involves the use of water-soluble polystyrene solvents.

Materials which will dissolve conventional amorphous polystyrene are generally well known to those skilled in the art. (See, for example, Boundy and Boyer, "Styrene, Its Polymers, Copolymers and Derivatives," Reinhold Publishing Co., New York (1952).) These materials include various aromatic compounds, heterocyclic compounds, ethers, ketones, esters and many others. Examples of such solvents are benzene, toluene, ortho-, meta-, and para-xylene, isopropylbenzene, chlorobenzene morpholine, thiophene, pyridine, pyrrole, tetralin, tetrahydrofuran, dioxane, propylene oxide diethyl ether, n-dipropyl ether, methyl ethyl ketone, methyl n-amyl ketone, butanone, cyclohexanone, isophorone, mesityl oxide, ethyl acetate, n-butyl acetate, isobutyl acetate, ethyl laurate, isoamyl laurate, benzyl acrylate, iodomethane, dibromomethane, dichloromethane, bromoform, trichloroethylene, carbon tetrachloride, chloroform, dichloroethane, ethylene monobromide, ethylene monochloride, acetal, carbon disulfide, phenylhydrazine, dimethylformamide, dimethylacetamide and many others. Such solvents can be used either alone or in miscible mixtures of two or more.

According to this invention, useful solutions can be prepared containing from as low as 2 or 3 weight percent crystalline polystyrene to as high as 40 or 50 weight percent crystalline polystyrene—although the solutions will be very viscous at the latter rather high concentrations. Preferred concentrations of solutions are those between about 5 weight percent and about 25 weight percent of crystalline polystyrene.

Crystalline polystyrene can vary in its degree of crystallinity. The present invention is particularly concerned with formation of solutions of polystyrene containing at least 1 or 2 percent of crystallinity—since the presence of even this small degree of crystallinity will make the polystyrene substantially non-dissolvable by conventional procedures. In general, it will be preferred to use polystyrene containing between about 5 and about 50 percent crystallinity in order to take full advantage of the unique properties attributable to such crystallinity.

The following examples will serve to illustrate further details of the practice and application of the present invention.

*Example 1*

Four grams of crystalline polystyrene (about 10–20 percent crystallinity) was placed in a 100 ml. stainless steel bomb with 40 cc. of dioxane. The bomb was flushed with nitrogen, closed, and heated at 180° C. for 16 hours with continuous agitation by rocking. A clear, colorless solution was formed and remained stable without separation upon cooling to room temperature.

*Example 2*

Fifteen grams of crystalline polystyrene (about 10–20 percent crystallinity), 100 ml. of benzene, 0.15 gr. each of two different stabilizers (4,4'-thiobis-(6-tert.-butyl-m-cresol) and strontium stearate) were slurried together in a 400 ml. stainless steel bomb which was then sealed and heated overnight at 195° C. The bomb was cooled to room temperature and opened, and the polystyrene was found to be completely dissolved in a smooth, clear, stable solution.

We claim:

1. The method of preparing a room-temperature stable solution from crystalline polystyrene containing at least 2 weight percent and up to 33 weight percent of polystyrene comprising heating crystalline polystyrene in a pressure vessel to a temperature of from about 160° C. to about 195° C. with between about 2 and about 49 times by weight of dioxane and the dioxane is maintained in the liquid phase throughout the heating operation, and thereafter cooling the solution of polystyrene to room temperature.

2. The method of preparing a room-temperature stable solution from crystalline polystyrene containing at least 2 weight percent and up to 33 weight percent of polystyrene comprising heating crystalline polystyrene in a pressure vessel to a temperature of from about 160° C. to about 195° C. with between about 2 and about 49 times by weight of benzene and the benzene is maintained in the liquid phase throughout the heating operation, and thereafter cooling the solution of polystyrene to room temperature.

3. The method of preparing a room-temperature stable solution from crystalline polystyrene containing at least 2 weight percent and up to 33 weight percent of polystyrene comprising heating crystalline polystyrene in a pressure vessel to a temperature of from about 160° C. to about 195° C. with between about 2 and about 49 times by weight of a known liquid solvent for conventional amorphous polystyrene and the said solvent is maintained in the liquid phase throughout the heating operation, and thereafter cooling the solution of polystyrene to room temperature.

4. The method of preparing a room-temperature stable solution from crystalline polystyrene containing at least 5 weight percent and up to 25 weight percent of polystyrene comprising heating crystalline polystyrene in a pressure vessel to a temperature of from about 170° C. to about 195° C. with between about 3 and about 19 times by weight of a known liquid solvent for conventional amorphous polystyrene and the said solvent has a normal boiling point below about 160° C. and above about 25° C. and is maintained in the liquid phase throughout the heating operation, and thereafter cooling the solution of polystyrene to room temperature.

5. The method of preparing a room-temperature stable solution from crystalline polystyrene containing at least 5 weight percent and up to 25 weight percent of polystyrene comprising heating crystalline polystyrene in a pressure vessel to a temperature of from about 170° C. to about 195° C. with between about 3 and about 19 times by weight of dioxane and the dioxane is maintained in the liquid phase throughout the heating operation, and thereafter cooling the solution of polystyrene to room temperature.

6. The method of preparing a room-temperature stable solution from crystalline polystyrene containing at least 5 weight percent and up to 25 weight percent of polystyrene comprising heating crystalline polystyrene in a pressure vessel to a temperature of from about 170° C. to about 195° C. with between about 3 and about 19 times by weight of benzene and the benzene is maintained in the liquid phase throughout the heating operation, and thereafter cooling the solution of polystyrene to room temperature.

7. The method of preparing a room-temperature stable solution from crystalline polystyrene containing at least 2 weight percent and up to 33 weight percent of polystyrene comprising heating crystalline polystyrene in a pressure vessel to a temperature of from about 160° C. to about 195° C. with between about 2 and about 49 times by weight of a conventional amorphous polystyrene solvent selected from the group consisting of benzene, toluene, ortho-, meta-, and para-xylene, isopropylbenzene, chlorobenzene, morpholine, thiophene, pyridine, pyrrole, tetralin, tetrahydrofuran, dioxane, propylene oxide, diethyl ether, n-dipropyl ether, methyl ethyl ketone, methyl n-amyl ketone, butanone, cyclohexanone, isophorone, mesityl oxide, ethyl acetate, n-butyl acetate, isobutyl acetate, ethyl laurate, isoamyl laurate, benzyl acrylate, iodomethane, dibromomethane, dichloromethane, bromoform, trichloroethylene, carbon tetrachloride, chloroform, dichloroethane, ethylene monobromide, ethylene monochloride, acetal, carbon disulfide, phenylhydrazine, dimethylformamide, and dimethylacetamide and the said solvent is maintained in the liquid phase throughout the heating operation, and thereafter cooling the solution of polystyrene to room temperature.

References Cited in the file of this patent

UNITED STATES PATENTS

| | | |
|---|---|---|
| 2,179,975 | Britton et al. | Nov. 14, 1939 |
| 2,639,275 | Vickers et al. | May 1, 1953 |

FOREIGN PATENTS

| | | |
|---|---|---|
| 538,782 | Belgium | Dec. 6, 1955 |

OTHER REFERENCES

Natta et al.: Journal of The American Chemical Society, volume 77, pages 1708–1710 (March 20, 1955).

Perry: Chemical Engineers' Handbook, 3rd edition (1950), pages 293 and 319.

Ang: Journal Poly. Science, volume 25, pages 127–129 (1957).

Boundy-Boyer: Styrene, Reinhold Publishing Co. (1952), pages 368 and 319.